(12) United States Patent
Haga et al.

(10) Patent No.: US 9,379,384 B2
(45) Date of Patent: Jun. 28, 2016

(54) METHOD FOR PRODUCING NON-GRAPHITIZABLE CARBON MATERIAL, NEGATIVE ELECTRODE MATERIAL FOR LITHIUM ION SECONDARY BATTERY, AND LITHIUM ION SECONDARY BATTERY

(71) Applicant: JFE CHEMICAL CORPORATION, Tokyo (JP)

(72) Inventors: Ryuta Haga, Tokyo (JP); Makiko Ijiri, Tokyo (JP); Tetsuo Shiode, Tokyo (JP); Katsuhiro Nagayama, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/304,547

(22) Filed: Jun. 13, 2014

(65) Prior Publication Data

US 2014/0294714 A1    Oct. 2, 2014

Related U.S. Application Data

(63) Continuation of application No. PCT/JP2012/007939, filed on Dec. 12, 2012.

(30) Foreign Application Priority Data

Dec. 16, 2011  (JP) .................................. 2011-275909
Oct. 24, 2012  (JP) .................................. 2012-234992

(51) Int. Cl.
*C01B 31/02*      (2006.01)
*H01M 4/587*    (2010.01)
*H01M 4/133*    (2010.01)
*H01M 10/0525*  (2010.01)

(52) U.S. Cl.
CPC ............... *H01M 4/587* (2013.01); *C01B 31/02* (2013.01); *H01M 4/133* (2013.01); *H01M 10/0525* (2013.01); *H01M 2220/20* (2013.01); *Y02E 60/122* (2013.01)

(58) Field of Classification Search
CPC ....................................................... C01B 31/02
See application file for complete search history.

(56) References Cited

U.S. PATENT DOCUMENTS 7,718,307 B2 *   5/2010   Shimizu et al. .................. 429/61

FOREIGN PATENT DOCUMENTS

| JP | 10-083814 A   | 3/1998  |
|----|---------------|---------|
| JP | 10308220 A    | 11/1998 |
| JP | 2003282049 A  | 10/2003 |
| JP | 2005123175 A  | 5/2005  |
| JP | 2011003332 A  | 1/2011  |

OTHER PUBLICATIONS

International Search Report for International Application No. PCT/JP2012/007939, dated Feb. 19, 2013, 2 pages.

* cited by examiner

*Primary Examiner* — Stuart Hendrickson
(74) *Attorney, Agent, or Firm* — Ditthavong & Steiner, P.C.

(57) ABSTRACT

A method for producing a non-graphitizable carbon material includes providing a raw material of a non-graphitizable carbon material. The raw material is cross-linked to obtain a cross-linked product. The cross-linked product is infusibilized to obtain an infusibilized product. The infusibilized product is baked to obtain the non-graphitizable carbon material. A mechanochemical treatment is performed on the cross-linked product or the infusibilized product.

1 Claim, 2 Drawing Sheets

ROTATION DIRECTION    CENTRIFUGAL FORCE

METHOD FOR PRODUCING NON-GRAPHITIZABLE CARBON MATERIAL, NEGATIVE ELECTRODE MATERIAL FOR LITHIUM ION SECONDARY BATTERY, AND LITHIUM ION SECONDARY BATTERY

CROSS-REFERENCE TO RELATED APPLICATIONS

The present application is a continuation application of International Application No. PCT/JP2012/007939, filed Dec. 12, 2012, which claims priority to Japanese Patent Application No. 2011-275909, filed Dec. 16, 2011 and to Japanese Patent Application No. 2012-234992, filed Oct. 24, 2012. The contents of these applications are incorporated herein by reference in their entirety.

BACKGROUND OF THE INVENTION

1. Field of the Invention

The present invention relates to a method for producing a non-graphitizable carbon material, a negative electrode material for a lithium ion secondary battery, and a lithium ion secondary battery.

2. Discussion of the Background

Nowadays, since there is growing worldwide awareness of global environment conservation issues, hybrid vehicles (HEV, PHEV) and electric vehicles (EV), which are effective for realizing the reduction of the amount of fossil fuels used and $CO_2$ emission, are receiving a lot of attention. There is a trend toward the research and development of lithium ion secondary batteries (LIB), which have a high energy density per volume and mass, and which can be easily reduced in size, for the power sources of hybrid vehicles and electric vehicles. Carbon materials are generally used as negative electrode materials of lithium ion secondary batteries. Other than carbon materials, for example, lithium salts of the metal or metal oxide of, for example, Si, Sn, Ti, or V and hybrid materials of carbon and metal, which have a high energy density, are currently in the research stage.

Among carbon materials, graphite-based materials have been widely used for, for example, mobile electronic devices because these materials have high capacity. Non-graphitizable carbon, which has high input-output performance and cycle performance, is receiving a lot of attention as a negative electrode material of on vehicle batteries. In particular, since batteries for hybrid vehicles are required to have high input-output performance, which is necessary to start a vehicle and to collect regenerated energy, and a life span property, with which it is possible to repeat charge and discharge cycles over a long time, non-graphitizable carbon materials are suitable for the negative electrode materials of the batteries of hybrid vehicles.

Regarding non-graphitizable materials as negative electrode materials of lithium ion secondary batteries, materials made from petroleum pitches or coal pitches have been disclosed (refer to, for example, Japanese Unexamined Patent Application Publication No. 3-252053, Japanese Unexamined Patent Application Publication No. 6-89721, Japanese Unexamined Patent Application Publication No. 8-115723, and Japanese Unexamined Patent Application Publication No. 9-153359).

SUMMARY OF THE INVENTION

According to one aspect of the present invention, a method for producing a non-graphitizable carbon material includes providing a raw material of a non-graphitizable carbon material. The raw material is cross-linked to obtain a cross-linked product. The cross-linked product is infusibilized to obtain an infusibilized product. The infusibilized product is baked to obtain the non-graphitizable carbon material. A mechanochemical treatment is performed on the cross-linked product or the infusibilized product.

According to another aspect of the present invention, a negative electrode material for a lithium ion secondary battery includes the non-graphitizable carbon material obtained by the method.

According to further aspect of the present invention, a lithium ion secondary battery includes a negative electrode material which includes the non-graphitizable carbon material obtained by the method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
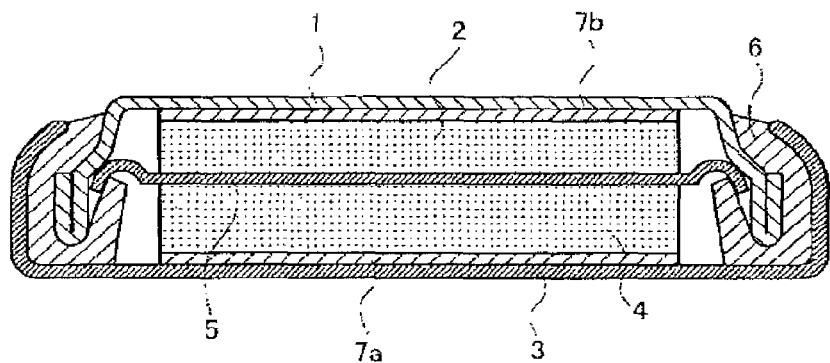
FIG. 1 is a diagram illustrating the cross section of a coin type secondary battery used for evaluation.

Embodiments of the present invention provide items (1) to (3) below.

(1) A method for producing a non-graphitizable carbon material, the method including a process of obtaining a cross-linked product by performing a cross-linking treatment on a raw material of a non-graphitizable carbon material, a process of obtaining an infusibilized product by performing an infusibilizing treatment on the cross-linked product, and a process of obtaining a non-graphitizable carbon material by baking the infusibilized product, in which a mechanochemical treatment is performed on the cross-linked product or the infusibilized product.

(2) A negative electrode material for a lithium ion secondary battery, the material containing the non-graphitizable carbon material obtained by the producing method according to item (1).

(3) A lithium ion secondary battery, the battery being fabricated using the non-graphitizable carbon material, as a negative electrode material, obtained by the producing method according to item (1).

According to the embodiments of the present invention, it is possible to obtain a non-graphitizable carbon material having high electrode density when being used as a negative electrode material of a lithium ion secondary battery.

The embodiments will now be described with reference to the accompanying drawings, wherein like reference numerals designate corresponding or identical elements throughout the various drawings

[Method for Producing Non-Graphitizable Carbon Material]

The method for producing a non-graphitizable carbon material according to the embodiment of the present invention (hereinafter, also simply referred to as "the producing method according to the embodiment of the present invention") is a method for manufacturing a non-graphitizable carbon material, the method including a process of obtaining a cross-linked product by performing a cross-linking treatment on a raw material of a non-graphitizable carbon material, a process of obtaining an infusibilized product by performing an infusibilizing treatment on the cross-linked product, a process of obtaining a non-graphitizable carbon material by baking the infusibilized product, in which a mechanochemical treatment is performed on the cross-linked product or the infusibilized product.

The producing method according to the embodiment of the present invention will be described in detail hereafter.

[Cross-Linking Treatment]

First, a cross-linked product is obtained by performing a cross-linking treatment on the raw material of a non-graphitizable carbon material (hereinafter, also simply referred to as "raw material").

Here, although there is no particular limitation on what raw materials are used in the producing method according to the embodiment of the present invention, and although well-known materials may be used, for example, pitches such as coal pitches and petroleum pitches; resins such as phenol resins and furan resins, or mixtures of pitches and resins may be used, and, in particular, it is preferable that pitches such as coal pitches and petroleum pitches be used from the viewpoint of, for example, economic efficiency.

Examples of methods for performing a cross-linking treatment on a raw material include a method utilizing an air blowing reaction; a dry method using an oxidizing gas (air or oxygen), and a wet method using an aqueous solution of, for example, nitric acid, sulfuric acid, hypochlorous acid, or mixed acid, and, among these methods, it is preferable that a method utilizing an air blowing reaction be used.

An air blowing reaction is a reaction in which the softening point of the raw material described above is increased by heating the raw material and by blowing an oxidizing gas (for example, air, oxygen, ozone, or a mixture of these gases) into the raw material. Utilizing an air blowing reaction, for example, a cross-linked product (for example, an air blown pitch) having a high softening point of 200° C. or higher can be obtained.

Here, according to Japanese Unexamined Patent Application Publication No. 9-153359, it is known that, since an air blowing reaction is a liquid state reaction, there is almost no intake of oxygen atoms into a carbon material in comparison with the case of a solid state cross-linking treatment.

In an air blowing reaction, an oxidative dehydration reaction mainly progresses and polymerization by biphenyl cross linking progresses. Then, it is considered that, by performing an infusibilizing treatment and baking (as described below), a non-graphitizable carbon material, which has a three dimensional structure without orientation mainly consisting of the cross-linked part, and which contains many pores therein where lithium can be absorbed, is obtained.

Although there is no particular limitation on what air blowing reaction conditions are used, since a mesophase generates in the case where the temperature is excessively high, and since there is a decrease in reaction rate in the case where the temperature is excessively low, it is preferable that the reaction temperature be 280° C. to 420° C., more preferably 320° C. to 380° C. In addition, it is preferable that the blowing rate of an oxidizing gas be 0.5 to 15 L/min, in terms of compressed air, for 1000 g of pitch, more preferably 1.0 to 10 L/min. There is no particular limitation on what reaction pressure is used, and the reaction may progress under any of normal pressure, a decompressed condition, and a pressurized condition.

It is preferable that the softening point of the cross-linked product such as an air blown pitch, which is obtained by performing a cross-linking treatment as described above, be 200° C. to 400° C. from the viewpoint of facilitating an infusibilizing treatment, more preferably 250° C. to 350° C.

[Pulverization]

It is preferable that a cross-linked product such as an air blown pitch, which is obtained by performing a cross-linking treatment, be pulverized in order to control the particle size. There is no particular limitation on what pulverizing method is used, and well-known methods may be used. In addition, it is preferable, for example, that the average particle diameter after pulverization has been performed be 1 to 50 μm, more preferably 2 to 15 μm. Here, pulverization like this may also be performed on an infusibilized product described below.

[Infusibilizing Treatment]

Subsequently, an infusibilizing treatment is performed on a cross-linked product such as an air blown pitch in order to obtain an infusibilized product (for example, an infusibilized pitch). An infusibilizing treatment is a kind of cross-linking treatment (oxidizing treatment) which is performed in the solid state, and, by performing this treatment, since oxygen is taken into the structure of the cross-linked product, cross-linking further progresses, which results in the product becoming less likely to melt at a higher temperature.

There is no particular limitation on what infusibilizing treatment method is used, and, for example, a dry method using an oxidative gas (air or oxygen) or a wet method using an aqueous solution of, for example, nitric acid, sulfuric acid, hypochlorous acid, or mixed acid may be used, and, among these methods, it is preferable that a dry method using an oxidative gas be used.

It is necessary to select a temperature equal to or lower than the softening point of the cross-linked product as a treatment temperature of an infusibilizing treatment. In addition, in the case of a treatment of a batch type, it is preferable that the heating rate be 5° C./hr to 100° C./hr in order to prevent fusion with more certainty, more preferably 10° C./hr to 50° C./hr.

Although there is no particular limitation on what other conditions are used for an infusibilization treatment, for example, it is preferable that the blowing rate of an oxidizing gas be 1.0 to 20 L/min, in terms of compressed air, for 1000 g of pitch, more preferably 2.0 to 10 L/min. There is no particular limitation on what reaction pressure is used, and the reaction may progress under any of normal pressure, a decompressed condition, and a pressurized condition.

It is preferable that the oxygen content in the infusibilized product, which is obtained by performing an infusibilizing treatment, be 3 to 20 mass % in order to prevent fusion when baking is performed, more preferably 5 to 15 mass %.

[Baking]

After an infusibilizing treatment has been performed, the infusibilized product such as an infusibilized pitch is baked under a decompressed condition or in an atmosphere of an inert gas such as nitrogen in order to obtain a non-graphitizable carbon material. At this time, it is preferable that the heating rate be 50° C./hr to 150° C./hr, more preferably 80° C./hr to 120° C./hr. In addition, it is preferable that the endpoint temperature (baking temperature) be 1000° C. to 1300° C., more preferably 1000° C. to 1200° C.

[Mechanochemical Treatment]

In the embodiment of the present invention, a mechanochemical treatment is performed on a cross-linked product such as an air blown pitch or on an infusibilized product such as an infusibilized pitch.

A mechanochemical treatment is a treatment in which compressive force and shear force are applied to particles at the same time. The compressive force and the shear force applied in this case are larger than those in the case of usual agitation, and it is preferable that these mechanical stresses be applied to the surface of a particle.

It is considered that, by performing a mechanochemical treatment, since particles of a non-graphitizable carbon material are rubbed against each other, the particles are rounded off to have a rounded shape, which results in an increase in electrode density when a working electrode (negative electrode) is formed using this non-graphitizable carbon material.

Here, "electrode density" means an average filling degree of the solid content of an electrode layer of an electrode which is formed of the electrode layer and a current collector, that is, an average density of the solid content of the electrode layer. For example, by measuring the masses and thicknesses of an electrode and a current collector, electrode density can be calculated from the measured masses and thicknesses.

There is no particular limitation on what apparatus is used for a mechanochemical treatment as long as compressive force and shear force are applied at the same time to a cross-linked product or an infusibilized product, and any apparatus, for example, a kneading machine such as a pressure kneader and a two roll mixing mill, a rotary ball mill, Hybridization System (manufactured by Nara Machinery Co., Ltd.), Mechano Micros (manufactured by Nara Machinery Co., Ltd.), or Mechanofusion system (manufactured by Hosokawa Micron Corporation) may be used.

Figure 3A:
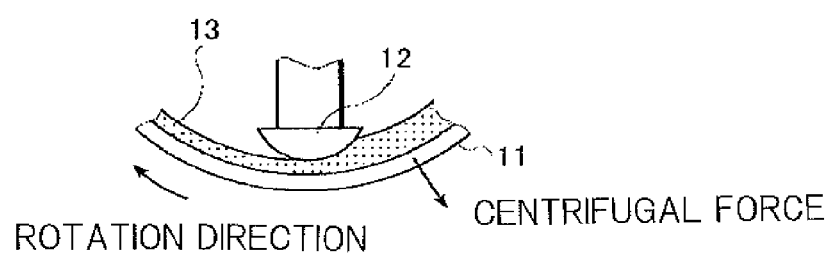
FIG. 3A is a schematic diagram illustrating the action mechanism of the apparatus used for a mechanochemical treatment.
Figure 3B:
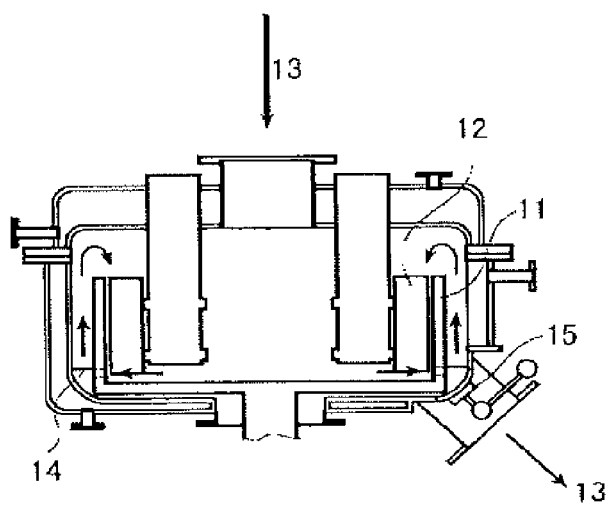
FIG. 3B is a schematic diagram illustrating the configuration of the apparatus used for a mechanochemical treatment.

Among these apparatuses, it is preferable to use an apparatus with which shear force and compressive force are applied at the same time by utilizing a difference in rotational velocity, for example, Mechanofusion system (manufactured by Hosokawa Micron Corporation), whose mechanism is illustrated in FIGS. 3A and 3B. The apparatus illustrated in FIGS. 3A and 3B include a rotary drum 11, an inner piece 12 whose rotational velocity is different from that of the rotary drum 11, and the circulation system 14 and discharging system 15 for a cross-linked product or infusibilized product 13. While centrifugal force is applied to the cross-linked product or infusibilized product 13 which is fed between the rotary drum 11 and the inner piece 12, a mechanochemical treatment is performed by repeatedly applying compressive force and shear force, which are caused by the difference in speed between the inner piece 12 and the rotary drum 11, at the same time.

Figure 2:
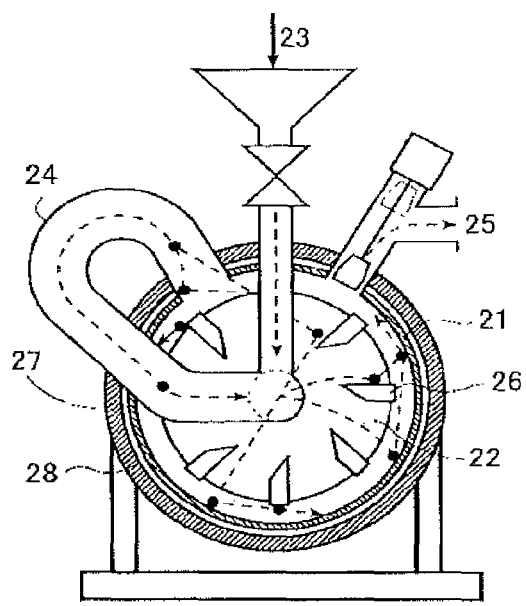
FIG. 2 is a schematic diagram illustrating the configuration of an apparatus used for a mechanochemical treatment.

Alternatively, Hybridization System (manufactured by Nara Machinery Co., Ltd.), which is illustrated in FIG. 2, may be used. The apparatus illustrated in FIG. 2 includes a fixed drum 21, a rotor 22 which rotates at a high rotational velocity, the circulation system 24 and discharging system 25 for a cross-linked product or infusibilized product 23, a blade 26, a stator 27, and a jacket 28. A mechanochemical treatment is performed by feeding the cross-linked product or infusibilized product 23 between the fixed drum 21 and the rotor 22 and by applying compressive force and shear force, which is caused by the difference in speed between the fixed drum 21 and the rotor 22, to the cross-linked product or infusibilized product 23.

It is not easy to determine the conditions of a mechanochemical treatment because the conditions depend on an apparatus to be used. If the treatment is performed under the conditions described below, particles are more rounded off and have a rounded shape, which results in further increase in electrode density.

For example, in the case where an apparatus including a rotary drum and an inner piece (refer to FIGS. 3A and 3B) is used, it is preferable that the difference in peripheral speed between the rotary drum and the inner piece be 5 to 50 m/sec, more preferably 5 to 30 m/sec. It is preferable that the distance between the two parts be 1 to 50 mm, more preferably 1 to 30 mm. It is preferable that the treatment time be 5 to 60 minutes, more preferably 20 to 60 minutes.

In addition, in the case where an apparatus including a fixed drum and a high speed rotor (refer to FIG. 2) is used, it is preferable that the difference in peripheral speed between the fixed drum and the rotor be 10 to 100 m/sec, more preferably 50 to 100 m/sec. It is preferable that the treatment time be 30 seconds to 5 minutes, more preferably 2 to 5 minutes.

[Non-Graphitizable Carbon Material]

The non-graphitizable carbon material obtained by a producing method according to the embodiment of the present invention (hereinafter also referred to as "non-graphitizable carbon material of the embodiment of the present invention") has, as described above, a nearly spherical shape, for example, a lump-like shape, a rounded indefinite shape, a spherical shape, or a shape having an oval cross section, and can be suitably used as a material of a negative electrode of a lithium ion secondary battery.

In addition, there is also an advantage in terms of safety in the case where a working electrode (negative electrode) is formed using the non-graphitizable carbon material according to the embodiment of the present invention. That is to say, for example, in the case where such a secondary battery as illustrated in FIG. 1 is fabricated, the working electrode (negative electrode) is pressed against a current collector made of copper foil and a separator impregnated with electrolyte solution. Since the non-graphitizable carbon material produced by the method according to the embodiment of the present invention has particles rounded off and having a rounded shape, damage to the current collector and the separator can be reduced when the working electrode (negative electrode) is produced using the non-graphitizable carbon material according to the embodiment of the present invention, which results in an advantage in terms of safety, because, for example, short circuit is prevented.

Although there is no particular limitation on the average particle diameter of the non-graphitizable carbon material according to the embodiment of the present invention, the diameter is normally 1 to 100 μm. The average particle diameter is a particle diameter with which an integrated frequency measured by a laser diffraction type particle size distribution meter is 50% in terms of volume percent. In addition, since there is a decrease in an initial charging and discharging efficiency and in the safety of a lithium ion secondary battery in the case where the specific surface area of a non-graphitizable carbon material is excessively large, it is preferable that the specific surface area be 15 $m^2/g$ or less, more preferably 8 $m^2/g$ or less. The specific surface area can be determined by a nitrogen gas absorption BET method.

It is preferable that the average lattice spacing $d_{002}$ of the non-graphitizable carbon material according to the embodiment of the present invention be 0.370 nm or more due to the reason that such carbon material is excellent in terms of discharging capacity and cycle life.

Subsequently, a lithium ion secondary battery, which is fabricated using the non-graphitizable carbon material according to the embodiment of the present invention as a negative electrode material (hereinafter, also referred to as "lithium ion secondary battery of the embodiment of the present invention"), will be described.

[Lithium Ion Secondary Battery]

A lithium ion secondary battery normally includes a negative electrode, a positive electrode, and non-aqueous electrolyte as main battery elements, where the negative and positive electrodes are respectively formed using lithium ion carriers, and the insertion and extraction of lithium ions take place between layers in a charging and discharging process. The mechanism of this kind of battery essentially functions in a manner such that lithium ions are doped into the negative electrode when the battery is charging and undoped from the negative electrode when the battery is discharging.

There is no particular limitation on the lithium ion secondary battery according to the embodiment of the present invention other than that the non-graphitizable carbon material according to the embodiment of the present invention is used as a negative electrode material, and other components of the battery may be the same as those which are used for common lithium ion secondary batteries.

[Negative Electrode]

There is no particular limitation on what method is used for forming a negative electrode from the non-graphitizable carbon material according to the embodiment of the present invention, and forming may be performed in accordance with common forming methods. When a negative electrode is formed, a negative-electrode mixture, in which a binder is added to the non-graphitizable carbon material according to the embodiment of the present invention, may be used. It is preferable that the binder have chemical stability and electrochemical stability against an electrolyte and that the content of the binder be about 1 to 20 mass % with respect to the total amount of the negative-electrode mixture. Specific examples of a binder include polyvinylidene fluoride, carboxymethylcellulose (CMC), and styrene-butadiene rubber (SBR). In addition, a carbon material or a graphite material other than the non-graphitizable carbon material according to the embodiment of the present invention may be used as an active material. Moreover, for example, carbon black or carbon fiber may be used as a conducting agent.

The particle size of the non-graphitizable carbon material is controlled by performing classification, a negative-electrode mixture is prepared by mixing the carbon material with a binder, and the negative-electrode mixture is normally applied to one or both sides of a current collector, thereby forming a negative-electrode mixture layer. At this time, a solvent may normally be used. There is no particular limitation on the shape of the current collector of a negative electrode, and examples of the shape include foil and a reticulate shape such as mesh or expand metal. Examples of the materials of a current collector include copper, stainless steel, and nickel.

[Positive Electrode]

It is preferable that a material capable of being doped/undoped with a sufficient amount of lithium ion be selected as a positive electrode (positive-electrode active material). Examples of such a positive-electrode active material include transition metal oxides, transition metal chalcogenides, vanadium oxides, and lithium containing compounds of these materials, and further, Chevrel compound represented by a general formula $M_XMo_6S_{8-Y}$ (where $0 \leq X \leq 4$, $0 \leq Y \leq 1$, and M represents metal such as transition metal), iron phosphate lithium, activated carbon, and activated carbon fiber. A single substance or two or more of these materials in combination may be used among these materials. For example, a carbonate such as lithium carbonate may be added to a positive electrode.

Examples of lithium containing transition metal oxides include complex oxides of lithium and transition metals and solid solutions of lithium and two or more of transition metals. Lithium containing transition metal oxides are specifically represented by $LiM(1)_{1-p}M(2)_pO_2$ (where $0 \leq P \leq 1$ and M(1) and M(2) represent one or more of transition metals) or by $LiM(1)_{2-q}M(2)_qO_4$ (where $0 \leq Q \leq 1$ and M(1) and M(2) represent one or more of transition metals). Here, examples of the metals represented by M include Co, Ni, Mn, Cr, Ti, V, Fe, Zn, Al, In, and Sn and, among these metals, Co, Fe, Mn, Ti, Cr, V, and Al are preferable.

These lithium containing transition metal oxides are obtained from starting materials such as Li, the oxides or salts of transition metals by mixing these starting materials in accordance with the composition of the lithium containing transition metal oxides and by baking the mixture at a temperature in the range from 600° C. to 1000° C. in an oxygen atmosphere. Here, the starting materials are not limited to oxides or salts, and hydroxides may be used.

As an example of a method for forming a positive electrode using the positive-electrode material described above, a positive-electrode mixture including the positive-electrode material, a binder, and a conducting agent is applied to both sides of a current collector so as to form a positive-electrode mixture layer. As a binder, the examples of the binder described for a negative electrode may be used. As a conducting agent, for example, a carbon material, graphite, carbon black, or VGCF may be used. There is no particular limitation on the shape of a current collector, and the collectors having the same shape as used for a negative electrode are used.

When the negative electrode and positive electrode described above are formed, various kinds of well-known additives such as conducting agent and a binder may be used as needed.

[Electrolyte]

As an electrolyte, a typical non-aqueous electrolyte containing lithium salt such as $LiPF_6$ or $LiBF_4$ as an electrolyte salt are used.

As a non-aqueous electrolyte, a liquid such as a non-aqueous electrolyte solution, a solid electrolyte, or a high-polymer electrolyte such as a gel electrolyte may also be used.

In the case where a liquid such as a non-aqueous electrolyte solution is used, as a non-aqueous solvent, an aprotic organic solvent such as ethylene carbonate, propylene carbonate, or dimethyl carbonate may be used.

Examples of high-polymer electrolytes include a matrix macromolecule which is gelatinized with a plasticizing agent (non-aqueous electrolyte solution). As a matrix macromolecule, each of the single substances of or the mixture of some of ether-based polymers such as a polyethylene oxide and a cross-linked polymer thereof, polymethacrylate-based polymers, polyacrylate-based polymers, and fluorine polymers such as polyvinylidene fluoride and vinylidene fluoride-hexafluoropropylene copolymer may be used, and, among them, fluorine polymers are preferable from the viewpoint of, for example, oxidation-reduction stability.

As an electrolyte salt and a non-aqueous solution which are the constituents of a plasticizing agent (non-aqueous electrolyte solution) which is added to a high-polymer electrolyte, those which are described above may be used.

Although the lithium ion secondary battery according to the embodiment of the present invention may use a separator, the battery may be fabricated using a gel electrolyte, for example, by placing a negative electrode, which contains the non-graphitizable carbon material according to the embodiment of the present invention, a gel electrolyte, and a positive electrode on top of one another in this order, and put the layered materials in a battery packaging material.

Since there is no particular limitation on the structure, shape, or configuration of the lithium ion secondary battery according to the embodiment of the present invention, for example, a laminated structure or a wound structure may be used, and any one of a cylinder shape, a square shape, and coin shape may be selected.

EXAMPLES

The present invention will be described in detail with examples hereafter. However, the present invention is not limited to these examples.

Example 1

First, 1000 g of a coal QI-less pitch (QI: 0.1 to 0.5 mass %, softening point: 82.5° C.) was charged into an autoclave provided with an anchor agitator and heated up to a temperature of 320° C. under a nitrogen gas stream, and then the pitch was heated at a temperature of 320° C. for 2 hours, while compressed air was blown into the pitch at a blowing rate of 2 L/min, in order to perform a cross-linking treatment utilizing an air blowing reaction. Then, the content of the autoclave (air blown pitch) was cooled down to the room temperature and discharged from the autoclave. The softening point (unit: ° C.) and oxygen content (unit: mass %) of the obtained air blown pitch are given in Table 1 below.

Subsequently, the obtained air blown pitch was pulverized using an atomizer in order to control the particle diameter of the pitch to be 10 μm, and the pulverized air blown pitch was subjected to a mechanochemical treatment. The mechanochemical treatment was performed using Mechanofusion system (manufactured by Hosokawa Micron Corporation), which has been described in reference to FIGS. 3A and 3B, under the condition that the peripheral speed of the rotary drum was 10 m/s.

Subsequently, the air blown pitch, which had been pulverized and subjected to a mechanochemical treatment, was charged into a rotary furnace and heated at a heating rate of 20° C./hr while compressed air was blown through the furnace at a blowing rate of 2 L/min, and then the heated pitch was held at a temperature of 250° C. for 3 hours as an infusibilizing treatment in order to obtain an infusibilized pitch. The oxygen content of the obtained infusibilized pitch is given in Table 1 below.

Subsequently, 100 g of the obtained infusibilized pitch was charged into a container having a lid made of graphite and heated up to a temperature of 1100° C. at a heating rate of 100° C./hr under a nitrogen gas stream, and then the heated pitch was baked at a temperature of 1100° C. for 3 hours in order to obtain carbon powder.

Example 2

In EXAMPLE 2, the material to be subjected to a mechanochemical treatment was different from that in EXAMPLE 1. That is to say, in EXAMPLE 2, air blown pitch was produced in the same manner as in EXAMPLE 1, the air blown pitch was pulverized, the pulverized pitch was subjected to an infusibilizing treatment, and then the obtained infusibilized pitch was subjected to a mechanochemical treatment. Then, the infusibilized pitch which had been subjected to a mechanochemical treatment was baked in order to obtain carbon powder. Here, the other conditions were the same as those in EXAMPLE 1.

Example 3

In EXAMPLE 3, the softening point of an air blown pitch and the oxygen content of an infusibilized pitch were different from those in EXAMPLE 1. That is to say, in EXAMPLE 3, 1000 g of a coal QI-less pitch (QI: 0.1 to 0.5 mass %, softening point: 82.5° C.) was charged into an autoclave provided with an anchor agitator and heated up to a temperature of 320° C. under a nitrogen gas stream, and then the pitch was heated at a temperature of 320° C. for 3 hours, while compressed air was blown into the pitch at a blowing rate of 2 L/min, in order to perform a cross-linking treatment utilizing an air blowing reaction. Then, the content of the autoclave (air blown pitch) was cooled down to the room temperature and discharged from the autoclave. The softening point (unit: ° C.) and oxygen content (unit: mass %) of the obtained air blown pitch are given in Table 1 below.

Subsequently, the obtained air blown pitch was pulverized using an atomizer in order to control the particle diameter of the pitch to be 10 μm, and the pulverized air blown pitch was subjected to a mechanochemical treatment. The mechanochemical treatment was performed using Mechanofusion system (manufactured by Hosokawa Micron Corporation), which has been described in reference to FIGS. 3A and 3B, under the condition that the peripheral speed of the rotary drum was 10 m/s.

Subsequently, 100 g of the air blown pitch, which had been pulverized and subjected to a mechanochemical treatment, was charged into a rotary furnace and heated at a heating rate of 20° C./hr while compressed air was blown through the furnace at a blowing rate of 2 L/min, and then the heated pitch was held at a temperature of 250° C. for 6 hours as an infusibilizing treatment in order to obtain an infusibilized pitch. The oxygen content of the obtained infusibilized pitch is given in Table 1 below.

Subsequently, 100 g of the obtained infusibilized pitch was charged into a container having a lid made of graphite and heated up to a temperature of 1100° C. at a heating rate of 100° C./hr under a nitrogen gas stream, and then the heated pitch was baked at a temperature of 1100° C. for 3 hours in order to obtain carbon powder.

Example 4

In EXAMPLE 4, the material to be subjected to a mechanochemical treatment was different from that in EXAMPLE 3. That is to say, in EXAMPLE 4, air blown pitch was produced in the same manner as in EXAMPLE 3, the air blown pitch was pulverized, the pulverized pitch was subjected to an infusibilizing treatment, and then the obtained infusibilized pitch was subjected to a mechanochemical treatment. Then, the infusibilized pitch which had been subjected to a mechanochemical treatment was baked in order to obtain carbon powder. Here, the other conditions were the same as those in EXAMPLE 3.

Example 5

In EXAMPLE 5, a coal pitch containing 4.5 mass % of primary QI (softening point: 85° C.) was used as a material pitch, and, other than that, all the conditions were the same as those in EXAMPLE 2. The softening point (unit: ° C.) and carbon content (unit: mass %) of the obtained air blown pitch and the oxygen content (unit: mass %) of the obtained infusibilized pitch are given in Table 1 below.

Example 6

In EXAMPLE 6, a coal pitch containing 14.8 mass % of primary QI (softening point: 110° C.) was used as a material pitch, and, other than that, all the conditions were the same as those in EXAMPLE 2. The softening point (unit: ° C.) and oxygen content (unit: mass %) of the obtained air blown pitch and the oxygen content (unit: mass %) of the obtained infusibilized pitch are given in Table 1 below.

Comparative Example 1

In COMPARATIVE EXAMPLE 1, a mechanochemical treatment was not performed, and, other than that, carbon powder was obtained in the same way as in EXAMPLE 1. That is to say, in COMPARATIVE EXAMPLE 1, after an air blown pitch had been pulverized, the pulverized pitch was subjected to an infusibilization treatment, and then the obtained infusibilized pitch was baked in order to obtain carbon powder.

Comparative Example 2

In COMPARATIVE EXAMPLE 2, a mechanochemical treatment was not performed, and, other than that, carbon powder was obtained in the same way as in EXAMPLE 3. That is to say, in COMPARATIVE EXAMPLE 2, after an air blown pitch had been pulverized, the pulverized pitch was subjected to an infusibilization treatment, and then the obtained infusibilized pitch was baked in order to obtain carbon powder.

Comparative Example 3

In COMPARATIVE EXAMPLE 3, a mechanochemical treatment was not performed, and, other than that, carbon powder was obtained in the same way as in EXAMPLE 5. That is to say, in COMPARATIVE EXAMPLE 3, after an air blown pitch had been pulverized, the pulverized pitch was subjected to an infusibilization treatment, and then the obtained infusibilized pitch was baked in order to obtain carbon powder.

Comparative Example 4

In COMPARATIVE EXAMPLE 4, a mechanochemical treatment was not performed, and, other than that, carbon powder was obtained in the same way as in EXAMPLE 6. That is to say, in COMPARATIVE EXAMPLE 4, after an air blown pitch had been pulverized, the pulverized pitch was subjected to an infusibilization treatment, and then the obtained infusibilized pitch was baked in order to obtain carbon powder.
Evaluation Subsequently, using each carbon powder obtained in all the examples and comparative examples as a negative electrode material, a secondary battery of a coin type (refer to FIG. 1) was fabricated in order to conduct various kinds of evaluation.
(Preparing Negative Electrode Mixture Paste)

First, using the obtained carbon powder as a negative electrode material, a negative electrode mixture paste was prepared. Specifically, the carbon powder (95 parts by mass) and a 12% N-methyl pyrrolidinone solution of polyvinylidene difluoride (5 parts by mass with respect to the total solid content) were charged into a planetary mixer and agitated at a rotational velocity of 100 rpm for 15 minutes, and, further, N-methyl pyrrolidinone was added so that the total solid content was 60%, and then, the solution was agitated for 15 minutes in order to prepare a negative electrode mixture paste.
(Forming Working Electrode (Negative Electrode))

After the prepared negative electrode mixture paste had been applied to a copper foil so that the paste spread uniformly, the coated copper foil was charged into a circulation dryer, and the solvent was vaporized at a temperature of 100° C. in order to form a negative electrode layer. Subsequently, the negative electrode layer was compressed using a roller press and punched into a circular shape having a diameter of 15.5 mm in order to form a working electrode (negative electrode) having a negative electrode mixture layer adhering to a current collector made of a copper foil. Here, before evaluation is conducted, the working electrode was dried at a temperature of 100° C. for 8 hours or more.
(Measuring Electrode Density)

After a pressure of 250 MPa had been applied to the formed working electrode which was placed between mirror plates having a certain area for 20 seconds, electrode density (unit: g/cm$^3$) was determined. Electrode density was calculated from the measured mass and thickness of the negative electrode mixture layer.
(Preparing Electrolyte)

LiPF$_6$ was dissolved in a mixed solvent prepared by mixing ethylene carbonate (33 vol. %) and methyl-ethyl carbonate (67 vol. %) at a concentration of 1 mol/dm$^3$ in order to prepare a non-aqueous electrolyte solution.
(Fabricating Battery for Evaluation)

Subsequently, using the prepared working electrode (negative electrode), a coin type secondary battery used for evaluation (also simply called "battery for evaluation"), which is illustrated in FIG. 1, was fabricated. FIG. 1 is a diagram illustrating the cross section of a coin type secondary battery used for evaluation.

First, a lithium metal foil was pressed to a nickel net and punched into a circular shape having a diameter of 15.5 mm in order to form a disk type counter electrode 4 made of a lithium foil adhering to a current collector 7a made of a nickel net.

Subsequently, after a separator 5 impregnated with electrolyte solution had been placed between the working electrode (negative electrode) 2 adhering to the current collector 7b and the counter electrode 4 adhering to the current collector 7a, the working electrode 2 was put in an outer cup 1 and the counter electrode 4 was put in an outer can 3, the outer cup 1 and the outer can 3 were put together, and then the peripheral portions of the outer cup 1 and the outer can 3 were seamed to each other with an insulation gasket 6 being placed between the peripheral portions for sealing in order to fabricate a battery for evaluation.

The fabricated battery for evaluation has a sealed structure as a result of the peripheral portions of the outer cup 1 and the outer can 3 being seamed to each other with the insulation gasket 6 being placed between the peripheral portions. Inside the sealed structure, as illustrated in FIG. 1, the current collector 7a, the counter electrode 4, the separator 5, the working electrode (negative electrode) 2, and the current collector 7b are placed on top of one another in this order from the inner surface of the outer can 3 to the inner surface of the outer cup 1.
(Charge and Discharge Test)

Using the fabricated battery for evaluation, a charge and discharge test was carried out at a temperature of 25° C. as described below. Here, in this test, a process in which lithium ions are doped into the carbon powder is called "charge" and a process in which lithium ions are undoped from the carbon powder is called "discharge".

First, constant current charge was performed with a current of 0.9 mA until the circuit voltage became 0 mV, and constant voltage charge was started when the circuit voltage became 0 mV and continued until the current became 20 µA. A charge capacity (unit: mAh/g) (first charge capacity) was derived from the current-carrying amount throughout the charge time. After that, there was a 120-minute break. Then, constant current discharge was performed with a current of 0.9 mA until the circuit voltage became 1.5 V, and a discharge capacity (unit: mAh/g) (first discharge capacity) was derived from the current-carrying amount throughout the discharge time. This was called the first cycle.
(Initial Efficiency, Initial Loss Capacity, and Volume Capacity)

From the results of the charge and discharge test described above, an initial loss capacity (unit: mAh/g) was derived on the basis of equation (I) below, and an initial efficiency (unit: %) was derived on the basis of equation (II) below. Further, on the basis of the electrode density of the formed working electrode, a volume capacity (unit: mAh/cm$^3$) was derived from equation (III) below.

$$\text{Initial loss capacity} = \text{first charge capacity} - \text{first discharge capacity} \quad \text{(I)}$$

$$\text{Initial efficiency} = (\text{first discharge capacity}/\text{first charge capacity}) \times 100 \quad \text{(II)}$$

$$\text{Volume capacity} = \text{electrode density} \times \text{first discharge capacity} \quad \text{(III)}$$

TABLE 1

|  | Pitch Material | | Air Blown Pitch | | Infusibilized Pitch | Mechano-chemical Treatment | Electrode Density | First Discharge Capacity | Initial Loss | Initial Efficiency | Volume Capacity |
|---|---|---|---|---|---|---|---|---|---|---|---|
|  | Kind of Pitch | QI [mass %] | Softening Point [° C.] | Oxygen Content [mass %] | Oxygen Content [mass %] | Treatment Object | (250 MPa) [g/cm³] | [mAh/g] | [mAh/g] | [%] | [mAh/cm³] |
| Example 1 | Coal Pitch | 0.1-0.5 | 280 | 1.2 | 7.5 | Air Blown Pitch | 1.08 | 399 | 93 | 81.1 | 431 |
| Example 2 | Coal Pitch | 0.1-0.5 | 280 | 1.2 | 7.3 | Infusibilized Pitch | 1.10 | 394 | 105 | 79.0 | 433 |
| Example 3 | Coal Pitch | 0.1-0.5 | 295 | 1.2 | 9.0 | Air Blown Pitch | 1.13 | 387 | 92 | 80.8 | 438 |
| Example 4 | Coal Pitch | 0.1-0.5 | 295 | 1.2 | 9.0 | Infusibilized Pitch | 1.10 | 393 | 107 | 78.6 | 433 |
| Example 5 | Coal Pitch | 4.5 | 282 | 1.4 | 10.5 | Infusibilized Pitch | 1.11 | 401 | 104 | 79.4 | 445 |
| Example 6 | Coal Pitch | 14.8 | 270 | 1.2 | 7.7 | Infusibilized Pitch | 1.18 | 371 | 97 | 79.3 | 437 |
| Comparative Example 1 | Coal Pitch | 0.1-0.5 | 280 | 1.2 | 7.3 | — | 1.03 | 393 | 92 | 81.1 | 405 |
| Comparative Example 2 | Coal Pitch | 0.1-0.5 | 295 | 1.2 | 9.0 | — | 1.04 | 393 | 107 | 78.6 | 409 |
| Comparative Example 3 | Coal Pitch | 4.5 | 282 | 1.4 | 10.5 | — | 1.04 | 397 | 103 | 79.4 | 413 |
| Comparative Example 4 | Coal Pitch | 14.8 | 270 | 1.2 | 7.7 | — | 1.05 | 375 | 95 | 79.8 | 394 |

From the comparison between EXAMPLES 1 through 6 and COMPARATIVE EXAMPLES 1 through 4, it was found that, in the case of EXAMPLES 1 through 6 where a mechanochemical treatment was performed, the electrode density was higher and the volume capacity was larger than in the case of COMPARATIVE EXAMPLES 1 through 4 where a mechanochemical treatment was not performed.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for producing a non-graphitizable carbon material, the method comprising:
   providing a raw material of a non-graphitizable carbon material;
   cross-linking the raw material to obtain a cross-linked product;
   infusibilizing the cross-linked product to obtain an infusibilized product; and
   baking the infusibilized product to obtain the non-graphitizable carbon material,
   wherein a treatment is performed on the cross-linked product or the infusibilized product, the treatment comprising applying a compressive force and shear force at the same time to particles in the cross-linked product or the infusibilized product.

* * * * *